United States Patent [19]
Aoki et al.

[11] Patent Number: 5,852,995
[45] Date of Patent: Dec. 29, 1998

[54] HEATING APPARATUS FOR VEHICLE

[75] Inventors: Shinji Aoki; Hajime Ito, both of Kariya; Toshio Morikawa, Toyota, all of Japan

[73] Assignee: Denso Corporation, Kariya, Japan

[21] Appl. No.: 936,257

[22] Filed: Sep. 24, 1997

[30] Foreign Application Priority Data

Oct. 1, 1996 [JP] Japan ................................ 8-260941

[51] Int. Cl.⁶ .................................................. F02D 41/16
[52] U.S. Cl. .............................. 123/339.16; 123/142.5 R
[58] Field of Search ....................... 123/339.16, 339.17, 123/339.18, 142.5 R

[56] References Cited

U.S. PATENT DOCUMENTS

| | | | |
|---|---|---|---|
| 4,836,164 | 6/1989 | Morozumi et al. | 123/339.17 |
| 4,883,034 | 11/1989 | Yashiki et al. | 123/339.17 |
| 4,993,377 | 2/1991 | Itakura . | |
| 5,121,725 | 6/1992 | Araki | 123/339.17 |
| 5,235,947 | 8/1993 | Watanabe | 123/339.17 |
| 5,249,559 | 10/1993 | Weber et al. | 123/339.17 |
| 5,265,571 | 11/1993 | Sodeno | 123/339.17 |
| 5,666,917 | 9/1997 | Fraser et al. | 123/339.18 |
| 5,711,262 | 1/1998 | Ban et al. | 123/142.5 R |

FOREIGN PATENT DOCUMENTS

A-6-92134  4/1994  Japan .

Primary Examiner—Erick R. Solis
Attorney, Agent, or Firm—Harness, Dickey & Pierce, PLC

[57] ABSTRACT

A viscous heater for heating cooling water for cooling a water cooled engine is provided in a cooling water circuit between the engine and a front heater core. Even if a viscous switch is turned on by a viscous ECU to heat a passenger compartment using the viscous heater, a viscous clutch is not immediately turned on when the engine is idling. That is, after a delay control time elapses after increasing an idling rotational speed of the engine to a target rotational speed, the viscous heater is turned on. The target rotational speed which is higher than a normal idling rotational speed is set in such a manner that the higher the cooling water temperature is, the lower the target rotational speed becomes. Thus, even if a large load is applied to the engine by operating the viscous heater when the engine is idling, it can improve fuel economy and prevent an engine stall.

12 Claims, 8 Drawing Sheets

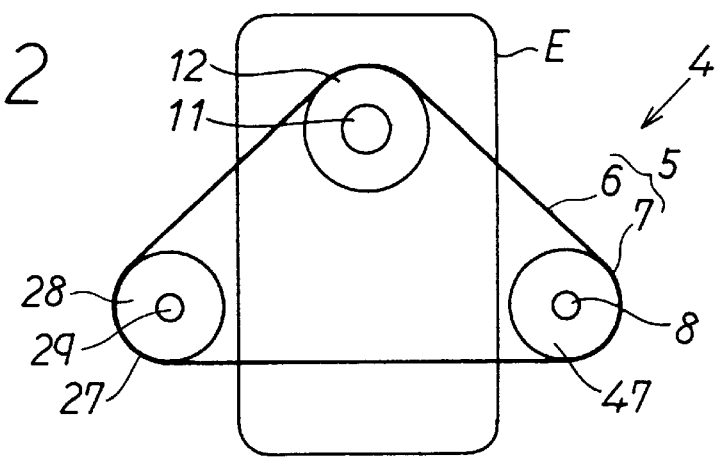
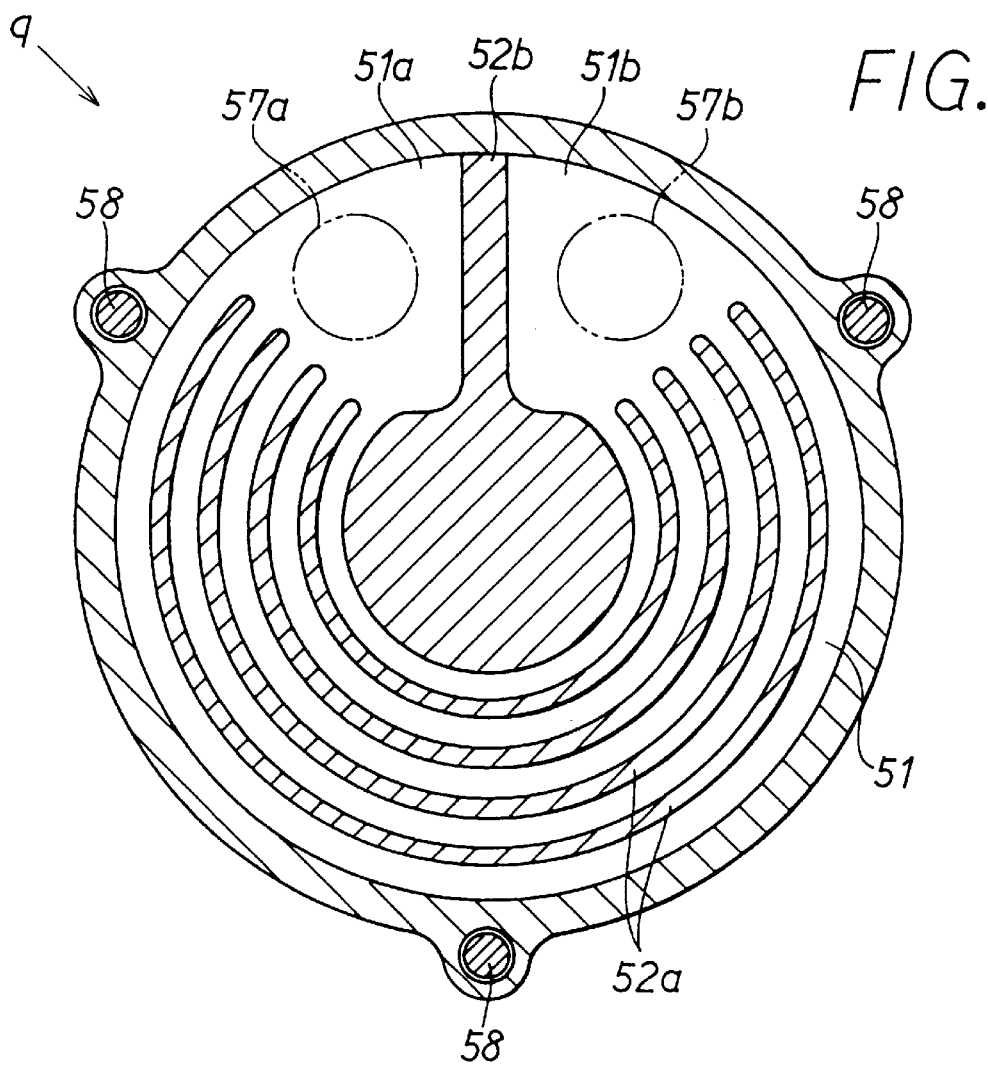

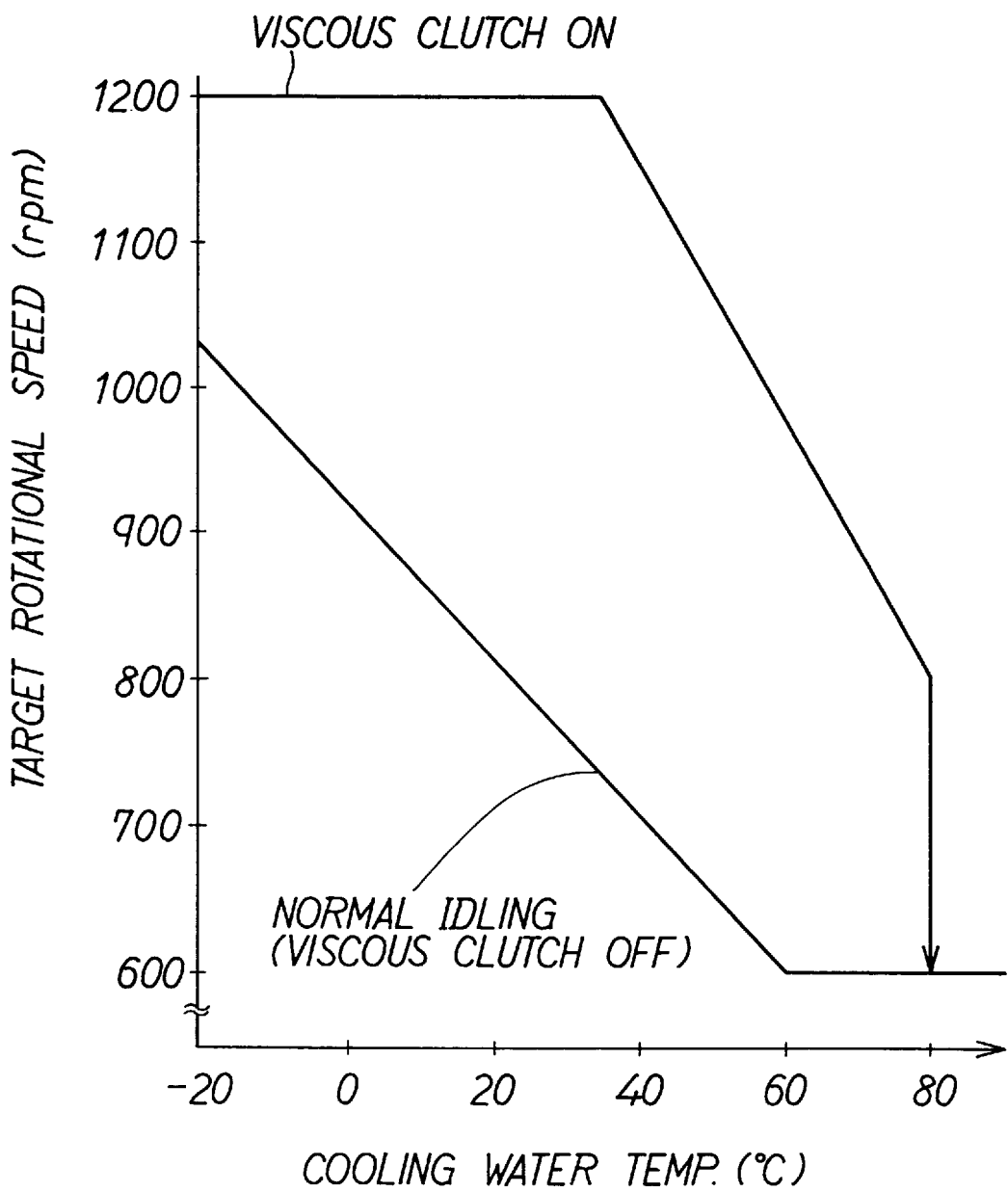

HEATING APPARATUS FOR VEHICLE

CROSS-REFERENCE TO RELATED APPLICATION

This application is related to and claims priority from Japanese Patent Application No. Hei. 8-260941 filed on Oct. 1, 1996, the contents of which are hereby incorporated by reference.

BACKGROUND OF THE INVENTION

1. Field of the Invention

The present invention relates to a heating apparatus for a vehicle, in which a heat-generating unit using a shearing force, for increasing a temperature of cooling water for cooling a water-cooled engine, is provided in a cooling water circuit.

2. Description of Related Art

Conventionally, as a heating apparatus for a vehicle, a hot water type heating apparatus for heating a passenger compartment has been generally known. In the hot water type heating apparatus, cooling water for cooling a water-cooled engine is supplied to a heater core disposed in a duct, and air heated while passing through the heater core is blown into the passenger compartment by a blower to heat the passenger compartment of the vehicle.

In a case of a vehicle having a diesel engine or a lean burn engine, heat generated in the engine is too small to heat the cooling water with engine sufficiently. In this case, because a temperature of cooling water to be supplied to a heater core cannot be maintained at a predetermined temperature (e.g., 80° C.), there occurs a problem in that a heating capacity for the passenger compartment is insufficient. Further, recently, an idling rotational speed of an engine is generally set at a low value to improve a fuel consumption rate (i.e., fuel economy). Therefore, the cooling water for cooling the engine cannot be heated sufficiently by decreasing heat loss from the engine, and thereby the heating capacity for the passenger compartment is insufficient.

To overcome such a problem, as disclosed in JP-A-6-92134, the following heating apparatus for a vehicle is conventionally proposed. In the heating apparatus for a vehicle, a heat-generating unit using a shearing force, for heating cooling water to be supplied to a heater core from an engine, is disposed in a cooling water circuit.

The heat-generating unit transmits a driving force of the engine to a shaft through a belt transmitting mechanism and the electromagnetic clutch. A heat-generating chamber is formed in a housing of the heat-generating unit, and a cooling water passage is formed at an outer periphery of the heat-generating chamber. A rotor which rotates integrally with the shaft is disposed in the heat-generating chamber, and a shearing force generated by a rotation of the rotor is applied to the viscous fluid such as silicon oil having a high viscosity, sealed in the heat-generating chamber to generate heat. The cooling water circulating in the cooling water passage is heated by the generated heat.

In the heating apparatus having the conventional heat-generating unit, even if the engine is idling, the electromagnetic clutch is turned on when the cooling water temperature is lower than a predetermined temperature, and therefore, a driving force (i.e., driving torque, driving load) of the engine is transmitted to the shaft and the rotor to operate the heat-generating unit. Thus, a large load is applied to the engine so that an engine stall may be caused. Particularly, when the cooling water has a low temperature, the viscosity of the viscous fluid such as silicon oil becomes extremely high, and therefore, a large load due to the driving torque is applied to the engine.

SUMMARY OF THE INVENTION

In view of the foregoing problems of the prior art, it is a first object of the present invention to provide a heating apparatus for a vehicle, which can prevent an engine from being stopped even if a large load is applied to the engine when a heat-generating unit using a shearing force heats cooling water for cooling the engine.

It is a second object of the present invention to provide a heating apparatus for a vehicle, which can decrease the fuel consumption rate of the engine by setting a target rotational speed of the engine E at a low value when the engine is idling.

Further, it is a third object of the present invention to provide a heating apparatus for a vehicle, which can provide a sufficient heating capacity for a passenger compartment when the engine is idling.

According to the present invention, a heating apparatus includes a heating heat exchanger for heating a passenger compartment by performing heat-exchange between cooling water having cooled a water-cooled engine and air to be blown into the passenger compartment, a heat-generating unit having a rotor which rotates when a driving force of the engine is applied thereto and a heat-generating chamber for sealing therein viscous fluid which generates heat for heating the cooling water circulating between the engine and the heating heat exchanger when a shearing force generated by a rotational force of said rotor is applied to the viscous fluid, a clutch unit for intermitting a transmission of the driving force of the engine, heating instruction means for giving an instruction for heating the cooling water by said heat-generating unit and a heating control unit. The heating control unit controls the clutch unit to transmit the driving force of the engine to the rotor of the heat-generating unit after increasing a rotational speed of the engine E when the heating instruction means gives the instruction for heating cooling water. Therefore, a shearing force is applied to the viscous fluid in the heat-generating chamber by the rotation of the rotor of the heat-generating unit to heat the cooling water circulating between the engine and the heating heat exchanger. Thus, even if the engine is idling, a sufficient heating capacity is provided for the passenger compartment by increasing the radiating amount of the heat heating exchanger. Because the driving force of the engine is transmitted to the rotor after increasing the rotational speed of the engine to a target rotational speed, the engine is not stopped when the engine is idling even if a large load is applied to the engine.

Preferably, when a driving state detected by driving state detection means is idling, the heating control unit controls the clutch unit to transmit the driving force of the engine to the rotor of the heat-generating unit after a predetermined time has elapsed after increasing an idling rotational speed of the engine to a target rotational speed. Therefore, it can prevent the engine from being stopped.

More preferably, the heating control unit includes physical amount detection means for detecting a physical amount relative to a temperature of the cooling water for cooling the engine, and the target rotational speed of the engine is set in such a manner that the larger the physical amount detected by the physical amount detection means is, the lower the target rotational speed becomes. Therefore, the fuel consumption rate of the engine is decreased to improve the fuel economy.

BRIEF DESCRIPTION OF THE DRAWINGS

Additional objects and advantages of the present invention will be more readily apparent from the following detailed description of preferred embodiments when taken together with the accompanying drawings, in which:

FIG. 2 is a schematic diagram showing an engine and a belt transmitting mechanism according to the first embodiment;

FIG. 4 is a cross-sectional view showing the viscous heater according to the first embodiment;

FIG. 9 is a graph for a control process of the engine ECU, showing a relationship between a cooling water temperature and a target rotational speed of the engine in the first embodiment.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described with reference to FIGS. 1–9.

Figure 1:
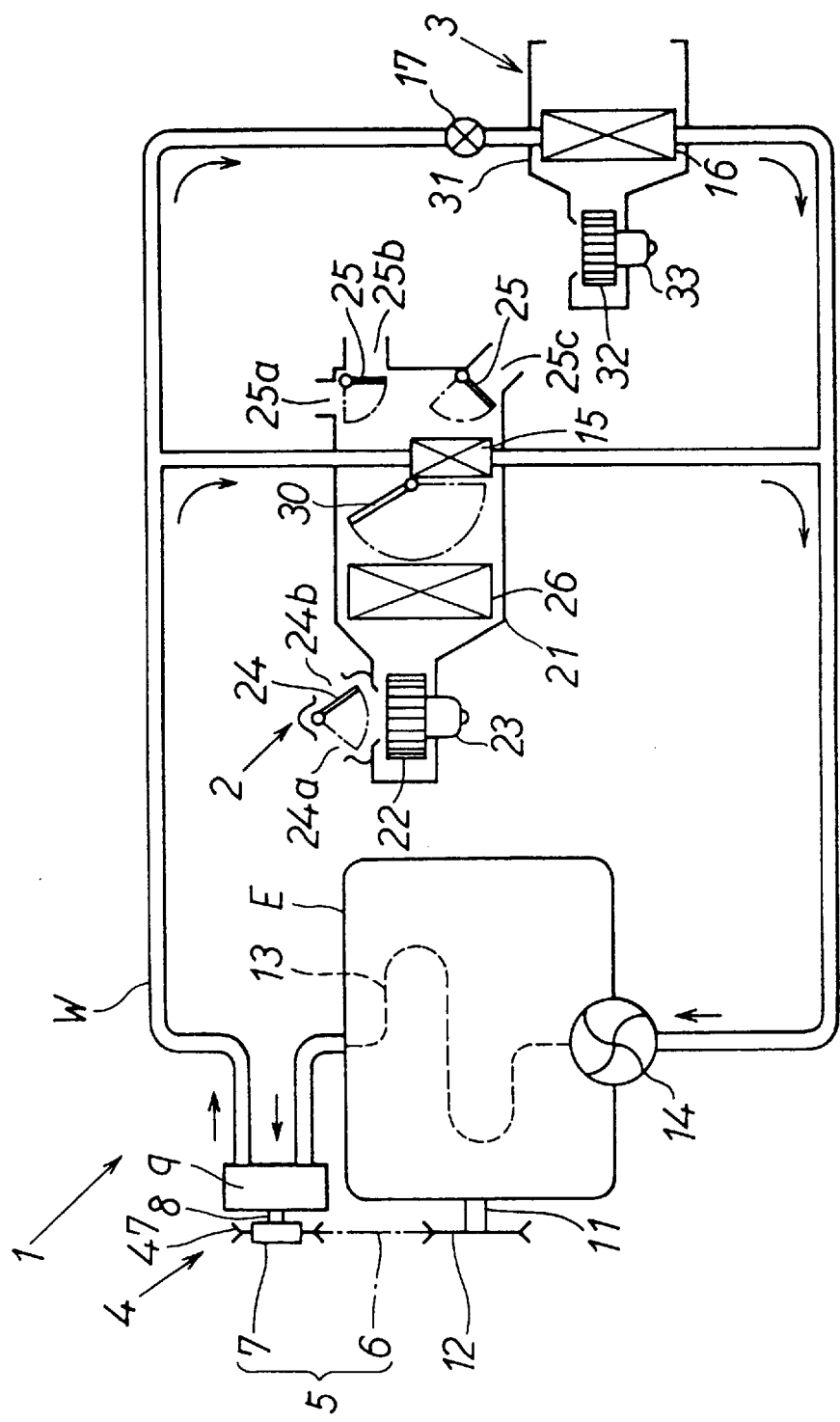
FIG. 1 is a schematic diagram showing an entire construction of an air-conditioning apparatus for a vehicle according to a first preferred embodiment of the present invention.

As shown in FIG. 1, an entire system 1 for a vehicle is equipped with a water-cooled diesel engine E (hereinafter referred to as "engine") disposed in an engine compartment of a vehicle, an air-conditioning unit 2 for air-conditioning a passenger compartment, a rear heating unit 3 for heating a rear-side of the passenger compartment, a heat-generating unit 4 using a shearing force for heating cooling water for cooling the engine E, an air-conditioning ECU 100 for controlling the air-conditioning unit 2 and the rear heating unit 3, a viscous ECU 200 for controlling the heat-generating unit 4, and an engine ECU 300 for controlling the engine E.

The engine E is provided with a cylinder block and a water jacket 13 around a cylinder head. A crank pulley 12 connecting to a V-belt 6 described later is attached to an output shaft (i.e., crankshaft) 11 of the engine E. The water jacket 13 is disposed in a cooling water circuit W through which the cooling water circuits.

In the cooling water circuit W, there is disposed a water pump 14 for compulsorily pumping the cooling water, a radiator (not shown) for cooling the cooling water by performing heat exchanging between the cooling water and air, a front heater core 15 for heating air by performing heat exchanging between the cooling water and air, a rear heater core 16 for heating air by performing heat-exchanging between the cooling water and air, a water valve 17 for controlling a supply and an interruption of the cooling water into the rear heater core 16, and the like. The water pump 14 is disposed at an upstream side of the water jacket 13 of the engine E and is rotated by the output shaft 11 of the engine E.

The air-conditioning unit 2 includes a front duct 21, a front blower 22, a refrigeration cycle, and a front heater core 15. At an upstream air side of the front duct 21, there is rotatably provided an inside/outside air switching damper 24 for selectively opening and closing an outside air inlet 24a and an inside air inlet 24b to switch an air inlet mode. At a downstream air side of the front duct 21, there is rotatably provided an air mode switching damper 25 for selectively opening and closing a defroster air outlet 25a, a face air outlet 25b and a foot air outlet 25c to switch an air outlet mode.

The front blower 22 is rotated by a blower motor 23 to generate an air flow toward the passenger compartment in the front duct 21.

The refrigerant cycle includes a compressor (i.e., refrigerant compressor), a condenser (i.e., a refrigerant condenser), a receiver (i.e., gas-liquid separator), an expansion valve (i.e., decompressing device), the evaporator (i.e., refrigerant evaporator) 26 and refrigerant pipes for connecting these parts in a round-shape.

The compressor is equipped with an electromagnetic clutch (hereinafter referred to as "clutch") 27, and compresses refrigerant sucked from the evaporator 26 and discharges the compressed refrigerant toward the condenser. A V-pulley 28 of the clutch 27 is connected to a crank pulley 12 (see FIG. 2) attached to the output shaft 11 of the engine E through the V-belt 6. When an electromagnetic coil of the clutch 27 is electrified, an output portion (i.e., armature, inner hub) is attracted to an input portion of the rotor so that a driving force of the engine E is transmitted to a rotational shaft 29 of the compressor. The evaporator 26 is disposed in the front duct 21 to cool air flowing therethrough.

The front heater core 15 is disposed in the front duct 21 at a downstream air side (i.e., downwind side) of the evaporator 26 and is connected to the cooling water circuit W at a downstream side of the heat-generating unit 4 with reference to the flow direction of the cooling water. The front heater core 15 heats air by performing heat-exchanging between the air having passed through the evaporator 26 and the cooling water.

At an upstream air side of the front heater core 15, there is rotatably provided an air-mixing damper 30. The air-mixing damper 30 adjusts a ratio between an amount of air (i.e., warm air) passing through the front heater core 15 and an amount of air (i.e., cool air) bypassing the front heater core 15 so that a temperature of air blown into the passenger compartment can be adjusted.

The rear heating unit 3 includes a rear duct 31, a rear blower 32, and a rear heater core 16. A foot air outlet (not shown) is opened at a downstream air side of the rear duct 31.

The rear blower 32 is driven by a blower motor 33 to generate an air flow toward the passenger compartment within the rear duct 31.

The rear heater core 16 is disposed in the rear duct 31 and is connected to the cooling water circuit W at a downstream side of the heat-generating unit 4 with reference to the flow direction of the cooling water through a water valve 17. The rear heater core 16 heats air by performing heat-exchanging between air passing through the rear duct 31 and the cooling water.

Next, the heat-generating unit 4 will be described briefly with reference to FIGS. 1 through 4.

The heat-generating unit 4 includes a belt transmitting mechanism 5 connected to and driven by the output shaft 11 of the engine E, and a heat-generating unit using a shearing force (hereinafter referred to as "viscous heater") 9 having a shaft 8.

The belt transmission mechanism 5 includes a multi-stage type V-belt 6 hung on the crank pulley 12 attached to the output shaft 11 of the engine E and an electromagnetic clutch 7 (hereinafter referred to as "viscous clutch") connected to and driven by the output shaft 11 of the engine E through the V-belt 6.

The V-belt 6 transmits a driving force (i.e., driving power) of the engine E to a shaft 8 of the viscous heater 9 through the viscous clutch 7. In the first embodiment, the V-belt 6 is hung on both of the clutch 27 and the viscous clutch 7.

Figure 3:
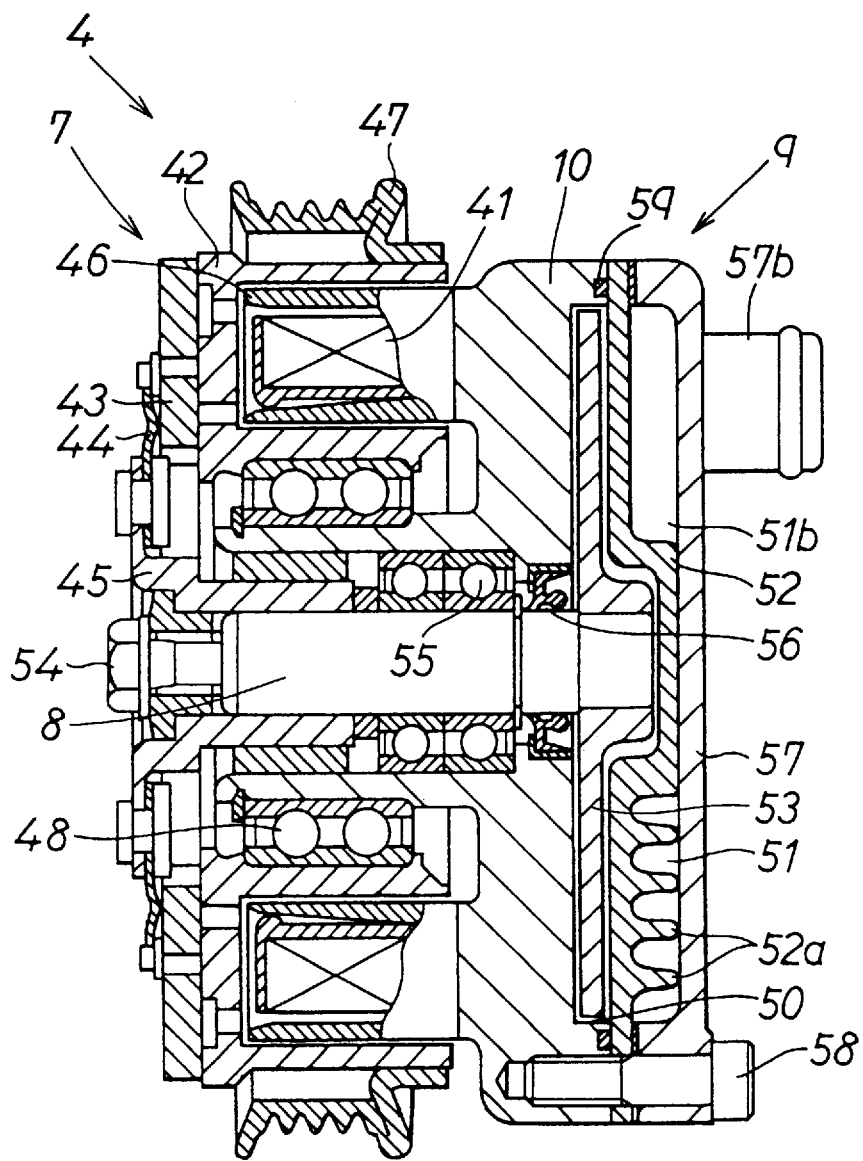
FIG. 3 is a cross-sectional view showing a viscous clutch and a viscous heater according to the first embodiment.

As shown in FIG. 3, the viscous clutch 7 includes an electromagnetic coil 41 for generating an electromotive force when being electrified, a rotor 42 rotated by the engine E, an armature 43 attracted toward the rotor 42 rotated by the electromotive force of the electromagnetic coil 41, and an inner hub 45 connected to the armature 43 with a plate spring 44 and supplying a rotational force to the shaft 8 of the viscous heater 9.

The electromagnetic coil 41 is formed by winding a conductive lead wire covered with an insulating material. The electromagnetic coil 41 is disposed in the stator 46 and is fixedly molded in the stator 46 with an epoxy resin. The stator 46 is fixed on a front surface of a housing 10 of the viscous heater 9.

A V-pulley 47 having the V-belt 6 on a periphery thereof is connected to the rotor 42 by connecting means such as welding. The rotor 42 is a rotating body which always rotates by the driving force of the engine E, transmitted thereto through the V-belt 6. The rotor 42 is formed of magnetic material to have a U-shaped cross section and is rotatably supported on an outer periphery of the housing 10 of the viscous heater 9 through a bearing 48 disposed in an inner periphery thereof.

The armature 43 has a friction surface formed in a ring-shaped plate, which is opposed to a friction surface of the rotor 42, formed in a ring-shaped plate, by an air gap therebetween. For example, a clearance between the friction surfaces of the rotor 42 and the armature 43 is 0.5 mm. The armature 43 is made of magnetic material. When the armature 43 is attracted to the friction surface of the rotor 42 by the electromotive force of the electromagnetic coil 41, the driving force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member. When the electric current supplying to the electromagnetic coil 41 is stopped, the plate spring 44 displaces the armature 43 in a direction (i.e., the left direction in FIG. 3) so that the armature 43 is separated (released) from the friction surface of the rotor 42 to return the armature 43 to an initial position thereof.

The inner hub 45 is used as an output portion of the viscous clutch 7. The input side of the inner hub 45 is connected to and driven by the armature 43 through the plate spring 44 and the output side of the inner hub 45 is connected to the shaft 8 of the viscous heater 9 with a spline fitting connection.

The viscous heater 9 is a supplementary heating source of the engine E which is the main heating source. The viscous heater 9 includes the shaft 8 rotated by the engine E through the V-belt 6 and the viscous clutch 7, a housing 10 for rotatably supporting the shaft 8, a separator 52 for dividing an inner space of the housing 10 into a heat-generating chamber 50 and a cooling water passage 51, and a rotor 53 rotatably disposed in the housing 10.

The shaft 8 is an input shaft which is fixedly fastened to the inner hub 45 of the viscous clutch 7 by fastening means such as a bolt and rotates integrally with the armature 43. The shaft 8 is rotatably disposed in an inner periphery of the housing 10 through a bearing 55 and a sealing member 56. The sealing member 56 employs an oil-seal for preventing a leakage of the viscous fluid.

The housing 10 is made of a metallic member such as aluminum alloy. A cover 57 formed in a ring-shaped plate is fixedly fastened to a rear end of the housing 10 by fastening means 58 such as a bolt and a nut. The separator 52 and a sealing member 59 is attached on a surface where the housing 10 and the cover 57 are joined. The sealing member 59 employs and O-ring for preventing a leakage of the cooling water.

The separator 52 is a partition member which is made of a metallic member such as aluminum alloy, which is superior in heat conductivity. An outer peripheral portion of the separator 52 is sandwiched between a cylindrical portion of the housing 10 and a cylindrical portion of the cover 57. The heat-generating chamber for sealing viscous fluid (e.g., silicon oil) which generates heat when a shearing force is applied thereto is formed between a front end surface of the separator 52 and a rear end surface of the housing 10.

The cooling water passage 51 is formed between a rear end surface of the separator 52 and an inner surface of the cover 57, and is liquid-tightly partitioned from the outside. The cooling water for cooling the engine E flows through the cooling water passage 51. Further, a plurality of fin portions 52a having a substantially arcuate shape, for efficiently transmitting heat of the viscous fluid to the cooling water is integrally formed on the rear end surface of the separator 52 at a lower side.

Instead of the fin portions 52a, the rear end surface of the separator 52 may be formed in a convex and concave shape, or a heat transmission facilitating member such as corrugated fins and fine pin fins may be formed on the outer wall surface of cover 57. Further, a labyrinth seal may be formed between the separator 52 and the rotor 53, and may be used as the heat-generating chamber 50.

As shown in FIG. 4, a partition wall 52b for partitioning the cooling water passage 51 into an upstream side water passage 51a and a downstream side water passage 51b is formed to protrude from the rear end surface of the separator 52. An inlet side cooling water pipe 57a through which the cooling water flows into the cooling water passage 51 and an outlet side cooling water pipe 57b through which the cooling water flows out from the cooling water passage 51 are connected to an outer wall portion of the cover 57 near the partition wall 52b.

The rotor 53 is rotatably disposed in the heat-generating chamber 50 and is fixed to an outer periphery of the rear end portion of the shaft 8. A plurality of groove portions (not shown) are formed on an outer peripheral surface or both side wall surfaces of the rotor 53, and a protrusion portion is formed between each of the adjacent groove portions. When the driving force of the engine E is supplied to the shaft 8, the rotor 53 rotates integrally with the shaft 8 to generate a shearing force to the viscous fluid sealed in the heat-generating chamber 50.

Figure 5:
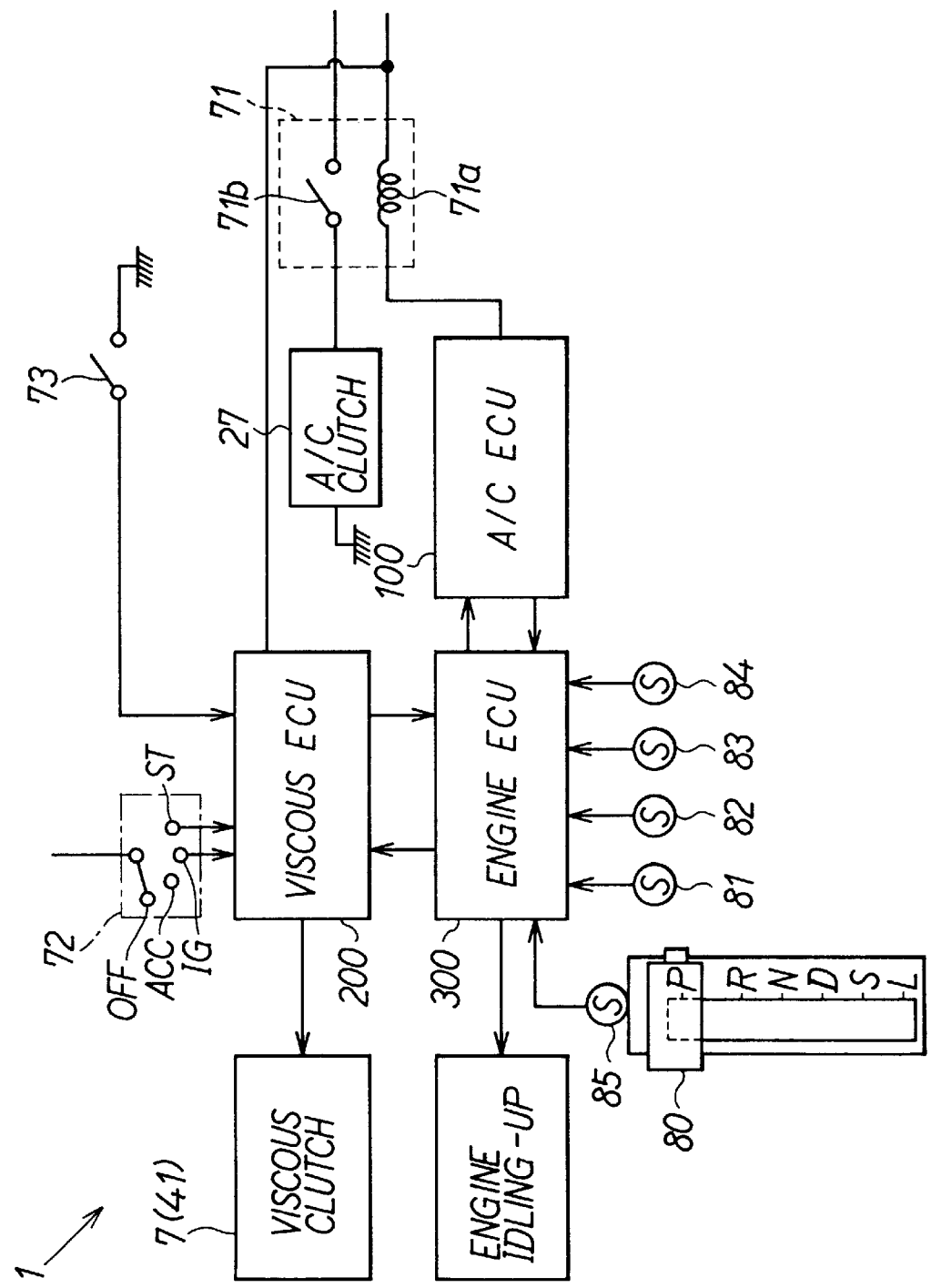
FIG. 5 is a block diagram showing an electric circuit of the air-conditioning apparatus for a vehicle according to the first embodiment.

Next an air-conditioning ECU 100 will be described briefly with reference to FIGS. 1, and 5. FIG. 5 shows an electric circuit of the system 1.

The air-conditioning ECU 100 is an electric circuit for performing a computer control of a cooling and heating equipment such as the compressor and the viscous heater 9 of the air-conditioning unit 2. The air-conditioning ECU 100 is a microcomputer in which a CPU, a ROM, and a RAM are incorporated.

The air-conditioning ECU 100 performs an air-conditioning control for the passenger compartment by controlling a cooling and heating equipment including the air-conditioning clutch relay 71 of the clutch 27, front blower 22, rear blower 32, and the like, based on input signals from various sensors (not shown) and the engine ECU 300, a pre-stored control program (not shown), and the like. The air-conditioning relay 71 includes a relay switch 71b and a relay coil 71a. When the air-conditioning relay 71 is electrified, the relay switch 71b is closed, thereby the clutch 27 is electrified.

When the air-conditioning unit 2 is operated, the air conditioning ECU 100 calculates a target air temperature TAO of air blown into the passenger compartment based on a temperature set by a temperature setting unit and an environmental condition detected environmental condition detection means including an inside air temperature sensor, an outside air temperature sensor, a sunlight sensor, the cooling water temperature sensor, a post-evaporator temperature sensor, and the like. Further, the opening degree of the are mixing damper 30 is changed based on the target air temperature TAO to control a temperature of air blown into the passenger compartment.

Next, the viscous ECU 200 will be described with reference to FIGS. 1 and 5. The viscous ECU 200 is an electric circuit for performing a computer control of a cooling and heating equipment such as the viscous heater 9. The viscous ECU 200 is a microcomputer in which a CPU, a ROM, and a RAM are incorporated. The viscous ECU 200 and the air-conditioning ECU 100 may be constructed by a microcomputer.

The viscous ECU 200 performs an air-conditioning control for the passenger compartment by controlling a cooling and heating equipment such as the electromagnetic coil 41 of the viscous clutch 6, based on input signals input from the relay coil 71a of an air-conditioning clutch relay 71, an ignition switch 72, a viscous switch 73 and the engine ECU 300, and a pre-stored control program (see FIG. 6), and the like. The ignition switch 72 includes each terminal of OFF, ACC, ST and IG. The terminal of ST is a stator operation switch for outputting a signal for supplying an electric current to a stator to the viscous ECU 200.

The viscous switch 73 is a switch for preferring a heating operation for the passenger compartment by using the viscous heater 9. When the viscous switch 73 is turned on, a heating preference signal is output to the viscous ECU 200. Further, the viscous switch 73 is an economical fuel consumption preference switch for giving an improvement of the fuel consumption rate (i.e., fuel economy) priority. When the viscous switch 73 is turned off, a fuel consumption preference signal is output to the viscous ECU 200.

Figure 6:
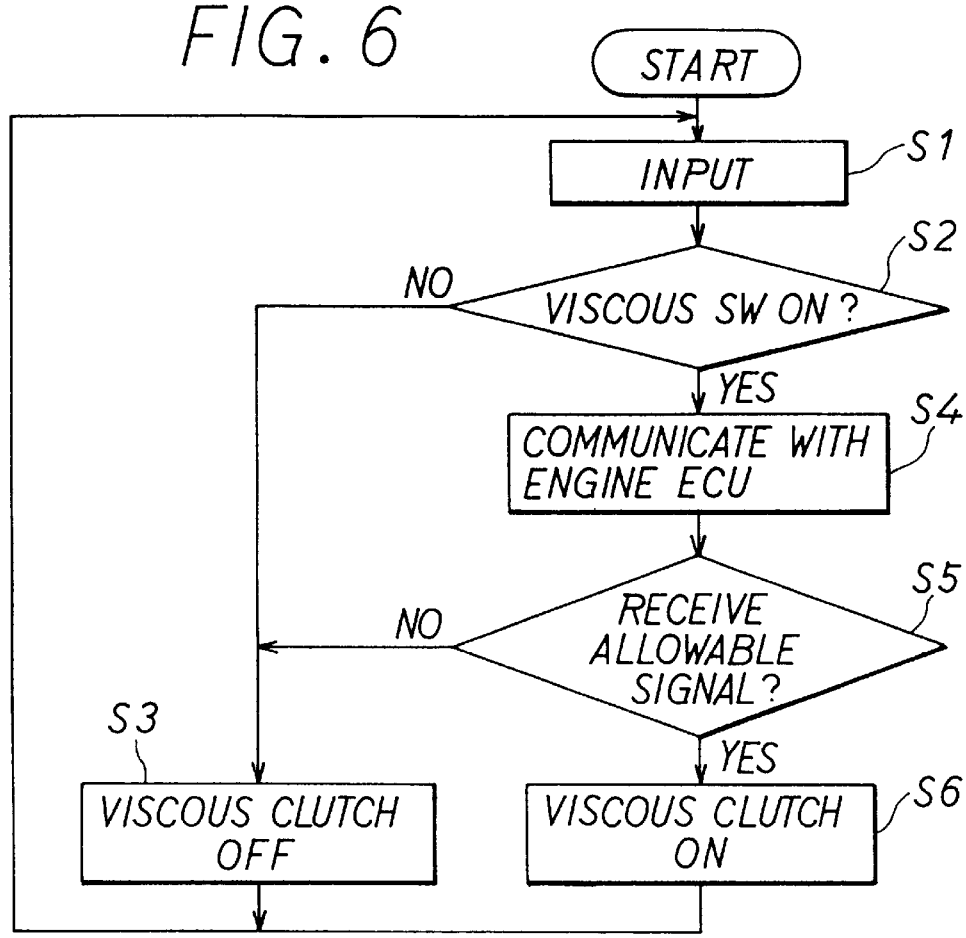
FIG. 6 is a flow chart showing a control program of a viscous ECU according to the first embodiment.
Figure 8:
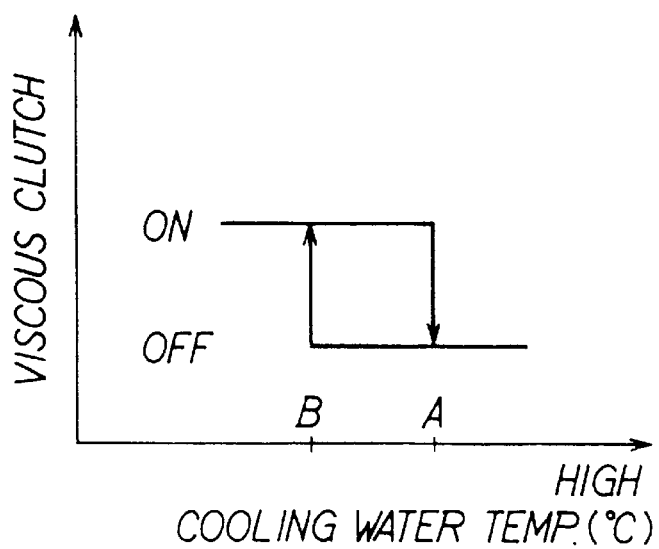
FIG. 8 is a graph for a control process of the engine ECU, showing a relationship between a cooling water temperature and an operation state of a viscous clutch in the first embodiment.

Next, the viscous ECU 200 will be briefly described with reference to FIGS. 1, 5 and 6. FIG. 6 is a flow chart showing a control program of the viscous ECU 200 according to the first embodiment.

Firstly, various kinds of sensor signals and switch signals are input at step S1.

Next, it is determined whether or not the viscous switch 73 is turned on, that is, whether or not the heating preference signal or the economical fuel consumption preference signal is input at step S2. When the determination is "NO", it is not necessary to heat the passenger compartment and a priority is given on the improvement of the fuel consumption rate of the engine E. Therefore, the electromagnetic coil 41 of the viscous clutch 7 is turned off, that is, the electric current supplying to the electromagnetic coil 41 of the viscous clutch 7 is stopped, and a rotation of the rotor 53 of the viscous heater 9 is stopped at step S3. Next, it proceeds to the process at the step S1.

When the determination is "YES" at the step S2, it performs a communication (transmits a signal to and receives a signal from) with the engine ECU 300 at step S4. Next, it is determined whether or not an allowable signal for allowing the electromagnetic coil 41 of the viscous clutch 7 to be turned on is received from the engine ECU 300. When the determination is "NO" at step S5, it proceeds to the process at step S3, and the electromagnetic coil 41 of the viscous clutch 6 is turned off.

When the determination is "YES" at the step S5, the electromagnetic coil 41 of the viscous clutch 7 is turned on to compensate an insufficient heating capacity in the maximum heating operation. That is, an electric current is supplied to the electromagnetic coil 41 of the viscous clutch 7 so that the rotor 53 of the viscous heater 9 is rotated at step S6. Next, it proceeds to the process at the step S1.

Next, The engine ECU 300 will be described with reference to FIGS. 1, 5 and 7.

The engine ECU 300 is an electric circuit for an engine control system for performing a computer control of the engine E. The engine ECU 300 is a microcomputer in which a CPU, a ROM, and a RAM are incorporated. The engine ECU 300 and the viscous ECU 200 or the engine ECU 300 and the air-conditioning ECU 100 may be constructed by a microcomputer.

Figure 7:
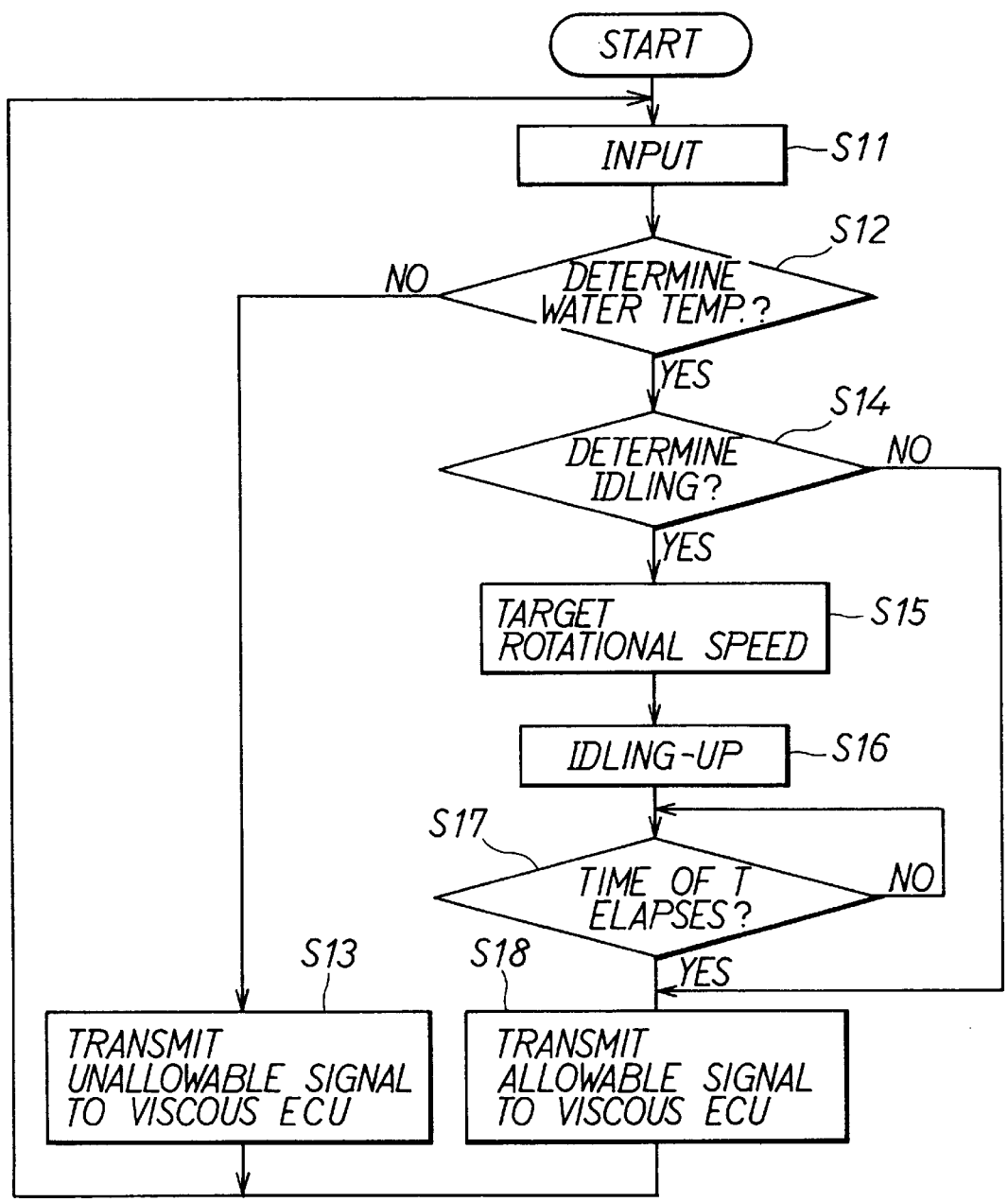
FIG. 7 is a flow chart showing a control program of an engine ECU according to the first embodiment.

The engine ECU 300 performs a viscous heater control, an idling rotational speed control (i.e., idling-up control) of the engine E, a fuel injection amount control, a fuel injection timing control, an intake air throttle control, an electric current control to a glow plug, and the like, based on an engine rotational speed sensor 81, a vehicle speed sensor 82, a throttle opening sensor 83, a cooling water temperature sensor 84, a lever position sensor 85, input signals input from the air-conditioning ECU 100 and the pre-stored control program (reference to FIG. 7). The engine ECU 300 also transmits signals required for processes of the air-conditioning ECU 100 or the viscous ECU 200 thereto.

The engine rotational speed sensor 81 detects a rotational speed of the output shaft 11 of the engine E and outputs an engine rotational speed signal to the engine ECU 300.

As the vehicle speed sensor 82, a reed switch type vehicle speed sensor, a photo-electric type vehicle speed sensor, or a MRE (i.e., Magnetic Resistance Element) type vehicle speed sensor can be used, for example. The vehicle speed sensor 82 detects a speed of the vehicle, and outputs a vehicle speed signal to the engine ECU 300.

The throttle opening sensor 83 detects an opening degree of the throttle valve disposed in an intake pipe of the engine E and outputs a throttle opening signal to the engine ECU 300.

The cooling water temperature sensor 84 employs a thermistor, for example, to detect a temperature of the cooling water in the cooling water circuit 10 (in this embodiment, a temperature of the cooling water flowing from the water jacket 13 of the engine E), and outputs a cooling water temperature detection signal to the engine ECU 300.

The lever position sensor 85 detects a set position of a select lever (i.e., shift lever) 80 provided proximate to a driver's seat in the passenger compartment, and outputs a lever position detection signal to the engine ECU 300. In the first embodiment, the select lever 80 includes a parking position (P), a reverse position (R), a neutral position (N), a driving position (D), a second position(S) and a low position (L). The driving position (D), the second position (S) or the low position (L) is a position for travelling the vehicle to the front side of the vehicle. The reverse position (R) is a position for travelling the vehicle to the rear side of the vehicle.

Next, a viscous heater control and an idling-up control of the engine ECU 300 will be briefly described with reference to FIGS. 1, 5, 7–9. FIG. 7 is a flow chart showing a control program of the engine ECU 300 according to the first embodiment.

Firstly, various kinds of sensor signals such as a vehicle speed signal detected by the vehicle speed sensor 82, a cooling water temperature signal detected by the cooling water temperature sensor 84 and a lever position signal detected by the lever position detection sensor 85 are input to the engine ECU 300 at step S11.

Next, it is determined whether or not the viscous clutch 7 is turned on or off according to the characteristics graph (reference to FIG. 8) of the viscous heater control based on the cooling water temperature, pre-stored in a memory circuit (e.g., ROM). That is, it is determined whether or not the cooling water temperature detected by the cooling water temperature sensor 84 is lower than a set cooling water temperature (i.e., the set value) at step S12. More specifically, as shown in the characteristics graph of FIG. 8, a hysteresis is given between a first set cooling water temperature A (e.g., 80° C.) and a second set cooling water temperature B (e.g., 70° C.). When the cooling water temperature is higher than the first set cooling water temperature, the viscous clutch 7 of the viscous heater 9 is turned off. When the cooling water temperature is lower than the first set cooling water temperature A or the second set cooling water temperature B, the viscous clutch 7 of the viscous heater is turned on. The hysteresis is set to the characteristics graph in FIG. 8; however, the hysteresis may not be given.

At the step S12, when the determination is "NO", an unallowable signal for allowing the electromagnetic coil 41 of the viscous clutch 6 not to be turned on are transmitted to the viscous ECU 200 at step S13. Then, it proceeds to the process at the step S11. Here, the process at the step S13 may be omitted.

When the determination is "YES" at the step S12, it is determined whether nor the operation state of the engine is idling at step S14. When the determination is "NO", it proceeds to the process at step S18. Specifically, it is determined whether or not the set position of the select lever 80, detected by the lever position detection lever 85, is at the parking position (P) or the neutral position (N), or at a travelling position such as the driving position (D). When it is determined that the set position of the select lever 80 is at the travelling position, it is determined whether or not a vehicle speed detected by the vehicle speed sensor 82 is less than a predetermined vehicle speed (e.g., 0km/h).

When the determination is "YES" at the step S14, the target rotational speed of the engine E is determined according to characteristics graph (reference to FIG. 9) of the idling-up control based on the cooling water temperature, pre-stored in a memory circuit (e.g., ROM) at step S15. Specifically, when a normal idling rotational speed (viscous clutch off) of the engine E is in a range of 600–1033 rpm and a cooling water temperature detected by the cooling water temperature sensor 84 is lower than a lower limit value (e.g., 30° C.), the target rotational speed of the engine in the idling is set to 1200 rpm according to the characteristics graph in FIG. 9, for example. When the cooling water temperature detected by the cooling water temperature sensor 84 is more than an upper limit value (e.g., 80° C.) when the engine is idling, the target rotational speed of the engine E is set to the normal rotational speed (e.g., 600 rpm) according to the characteristics graph in FIG. 9, for example. When the cooling water temperature detected by the cooling water temperature sensor 84 is higher than the lower limit value and lower than the upper limit value when the engine is idling, the target rotational speed is set according to the characteristics graph in FIG. 9 in such a manner that the higher the cooling water temperature is, the lower the target rotational speed of the engine E becomes.

Next, an idling-up control for stepwise increasing the idling rotational speed of the engine E is performed at step S16. That is, an intake air amount is increased to stepwise increasing the idling rotational speed to the target rotational speed determined at the step S15. Next, it is determined whether or not a delay control time (e.g., 0.5–1.0 seconds) of T elapses at step S17. When the determination is "NO" at the step S17, it repeats the precess at the step S17. When the determination is "YES" at the step S17, an allowable signal for allowing the viscous clutch 7 to be turned on is transmitted to the viscous ECU 200. Next, it proceeds to the process at the step S11.

Next, an operation of the system 1 according to the first embodiment will be briefly described with reference to FIGS. 1–9.

When the engine E starts, the output shaft 11 of the engine E rotates, and the driving force of the engine E is transmitted to the rotor 42 through the V-belt 6 of the belt transmitting mechanism 5. Here, when the viscous switch 73 is turned on; the cooling water temperature is lower than the set cooling water temperature; and the engine E is idling, the target rotational speed of the engine is set to a high value according to the characteristics graph of the idling-up control based on the cooling water temperature. After the delay control time of T elapses after performing the idling-up control, the electromagnetic coil 41 of the viscous clutch 7 is turned on. When the engine E is not idling, the electromagnetic coil 41 of the viscous clutch 7 is turned on without performing the idling-up control when the viscous switch 73 is turned on and the cooling water temperature is lower than a set cooling water temperature. Because the electromagnetic coil 41 of the viscous clutch 7 is turned on, the armature 43 is attracted to the friction surface of the rotor 42 by electromotive force of the electromagnetic coil 41 to transmit the driving force of the engine E to the inner hub 45 and the shaft 8.

Because the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51 of the viscous heater 9, the cooling water is heated while absorbing heat generated in the viscous fluid through the plurality of the fin portions 52a formed integrally with the separator 52. The cooling water heated by the viscous heater 9 is supplied to the heater core 15 so that the heating operation of the passenger compartment is performed with a large heating capacity.

The heating capacity of the viscous heater 9 may be set freely in advance by a viscous coefficient of the viscous fluid sealed in the heat-generating chamber 50. That is, the larger the viscous coefficient the viscous fluid has, the larger the shearing force applied by the rotation of the rotor 53 becomes. Therefore, the heat-generating capacity of the viscous heater 9 is increased, and the load and the fuel consumption rate of the engine E become larger. On the other hand, the smaller the viscous coefficient the viscous fluid has, the smaller the shearing force applied by the rotation of the rotor 53 becomes. Therefore, the heat-generating capacity of the viscous heater 9 is decreased, and the load and the fuel consumption rate of the engine E become lower.

As described above, according to the first embodiment, even if the viscous switch 73 is turned on or the cooling water temperature detected by the cooling water temperature sensor 84 is lower than the set cooling water temperature (set value), the viscous clutch 7 is turned off during the delay control time of T elapses after performing the idling-up control when the engine is idling. Thus, when the engine is in a normal idling (i.e., viscous clutch is turned off), a large load is not applied to the engine E. Further, when the engine is idling, the driving force of the engine E is transmitted to the shaft 8 and the rotor 53 through the V-belt 6 after the delay control time of T elapses after setting the idling rotational speed to a high value. Therefore, even if a large load is applied to the engine E when the engine is idling, it can prevent an engine stall so that it can prevent the engine E from being stopped. Further, even if a large load is applied to the engine by increasing the radiating amount of the front heater core 15 or the rear heat core 16 when the engine is idling, a sufficient heating capacity for the passenger compartment can be provided.

Further, when the cooling water temperature is lower than the upper limit value and higher than the lower limit value when the engine is idling, the target rotational speed is set in such a manner that the higher the cooling water temperature of the engine E is, the lower the target rotational speed which is higher than the normal idling rotational speed becomes. Therefore, the fuel consumption rate of the engine E can be decreased to improve the fuel economy.

Figure 10:
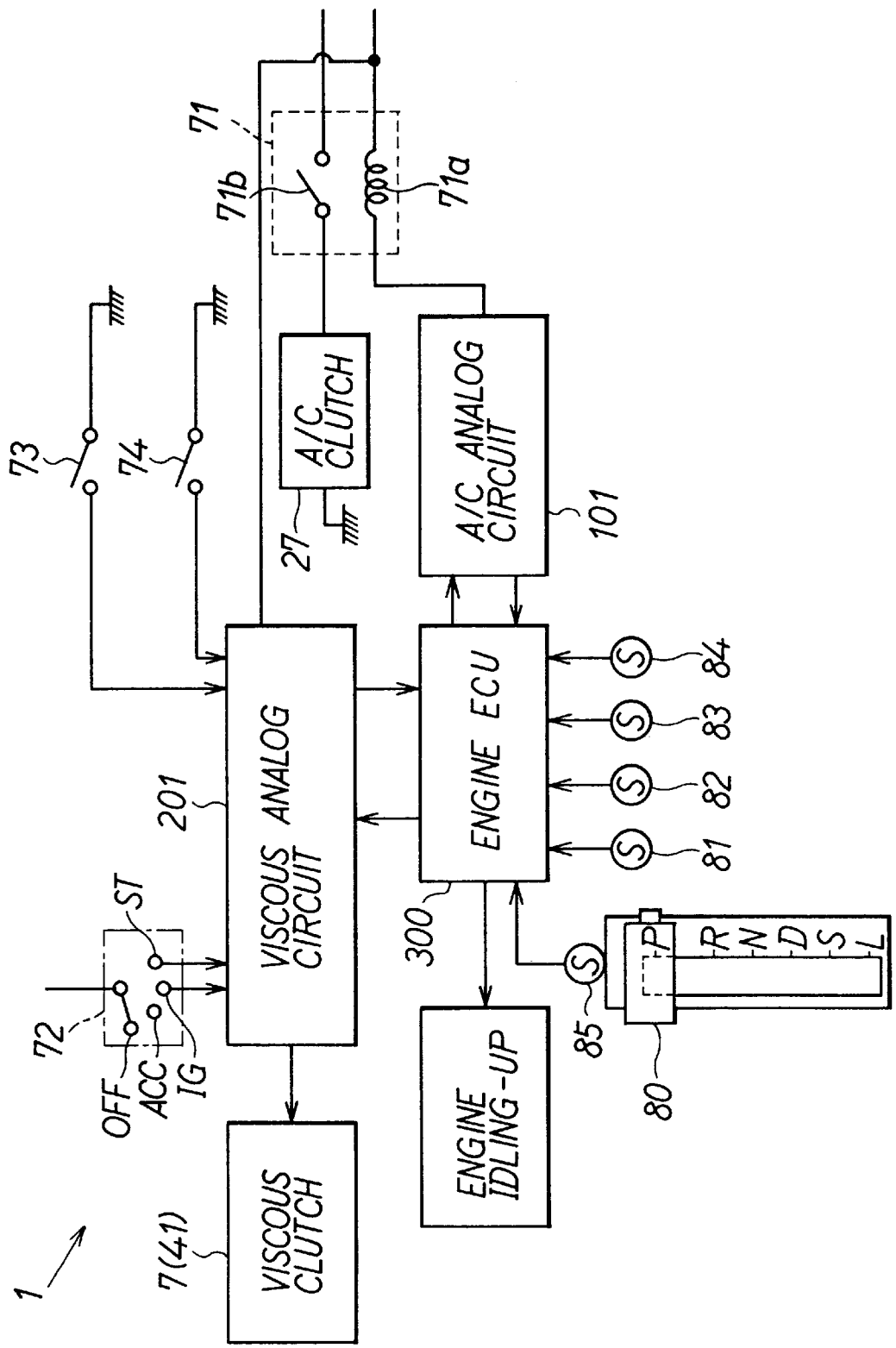
FIG. 10 is a block diagram showing an electric circuit of the air-conditioning apparatus for a vehicle according to a second preferred embodiment of the present invention.

A second preferred embodiment of the present invention will be described with reference to FIGS. 10. FIG. 10 shows an electric circuit for an air-conditioning apparatus according to the third embodiment.

In the second embodiment, instead of the air-conditioning ECU 100 and the viscous ECU 200 of the first embodiment, an air-conditioning analog circuit 101 for analog-controlling the air-conditioning apparatus 2 and a viscous analog circuit 201 for analog-controlling the viscous clutch 7 are provided in the electric circuit as shown in FIG. 10.

The engine ECU 300 and the various sensors and the like are connected an input side of the air-conditioning analog circuit 101. The cooling and heating equipment such as the air-conditioning clutch relay 71 of the clutch 27, the front blower 22, the rear blower 32, and the engine ECU 300 are connected to an output side of the air-conditioning analog circuit 101. At an input side of the viscous analog circuit 201, the relay coil 71a of the air-conditioning relay 71, the terminals of ST and IG of the ignition switch 72, the viscous switch 73, the cooling water temperature switch 74 and the engine ECU 300 are connected. Further, at an output side of the viscous analog circuit 201, the electromagnetic coil 41 of the viscous clutch 7 and the engine ECU 300 are connected.

When the cooling water temperature (in the second embodiment, the cooling water temperature in the outlet side cooling water pipe 57b of the cooling water passage 51 of the viscous heater 9) is more than a first predetermined temperature A (e.g., 80° C.), the cooling water temperature switch 74 is turned off (i.e., opened). When the cooling water temperature is less than the first predetermined temperature A or a second predetermined temperature B (e.g., 70°–75° C.), the cooling water temperature switch is turned on (i.e., closed).

In the second embodiment, even if the viscous switch 73 and the cooling water temperature switch 74 are turned on, when it is determined that the engine E is idling, the viscous clutch 7 is turned off during the delay control time (e.g., 0.5–1.0 seconds) of T after setting the idling rotational speed of the engine E to a high value. That is, after the delay control time of T elapses after the idling-up control, the viscous ECU 200 receives an allowable signal for allowing the viscous clutch 7 to be turned on from the engine ECU 300. Thus, even if a large load is applied to the engine E by operating the viscous heater 9 when the engine E is idling, it can prevent an engine stall.

Although the present invention has been fully described in connection with preferred embodiments thereof with reference to the accompanying drawings, it is to be noted that various changes and modifications will become apparent to those skilled in the art.

For example, in each of the above-described embodiments, the belt transmission mechanism 5 and the viscous clutch 7 are connected to and driven by the output shaft 11 of the engine E to rotate the shaft 8 of the viscous heater 9; however, the viscous clutch 7 may be directly connected to the crank shaft 11 of the engine E to rotate the shaft 8 of the viscous heater 9. Further, a gear transmission having at least one stage gear or a V-belt type non-stage transmission may be connected between the crank shaft 11 of the engine E and the viscous clutch 7 or between the viscous clutch 7 and the shaft 8 of the viscous heater 9.

In the above-described embodiments, the V-belt 6 of the belt transmission mechanism 5 are hung on both of the viscous clutch 7 and the air conditioning clutch 27; however, the V-belt 6 of the belt transmission mechanism 5 may be hung on a supplementary equipment such as the water pump 14, a hydraulic pump for power steering, a hydraulic pump for supplying operation oil to the automatic transmission, a hydraulic pump for supplying lubricating oil to the engine E, or an alternator for charging a battery installed in the vehicle with the viscous clutch 7.

In each of the above-described embodiment, a water-cooled diesel engine is used as the engine E; however, the other water-cooled engine such as a gasoline engine may be used. Further, the compressor 31 and the viscous heater 7 may be driven by the other water-cooled engine or an air-cooled engine which are not used as the above-described engine E and as the heating source.

In each of the above-described embodiments, the present invention is applied to an air-conditioning apparatus for a vehicle to perform a heating operation and a cooling operation for the passenger compartment; however, the present invention may be applied to an air-conditioning apparatus for a vehicle to perform only a heating operation for the passenger compartment.

In each of the above-described embodiments, the cooling water temperature sensor 84 for detecting a temperature of the cooling water from the water jacket 13 of the engine E is used; however, a cooling water temperature sensor for detecting a temperature of the cooling water at an inlet side of the front heater core 15 or rear heat core 16 may be used. Further, a cooling water temperature sensor or a cooling water temperature switch for detecting a temperature of the cooling water at an outlet side of the cooling water pipe 57b of the cooling water passage 51 of the viscous heater 9 may be used. Further, a cooling water temperature switch for detecting a temperature of cooling water at an outlet side of the engine E may be used. Further, as the physical amount detection means, an oil temperature sensor for detecting oil temperature of the viscous fluid in the heat-generating chamber 50 and outputting an oil temperature signal to the engine ECU 300, an air temperature sensor for detecting a temperature of air blown out from the front heater core 15 or the rear heater core 16 and outputting air temperature signal to the engine ECU 300 and the like may be used.

Such changes and modifications are to be understood as being within the scope of the present invention as defined by the appended claims.

What is claimed is:

1. A heating apparatus for heating a passenger compartment of a vehicle having a water-cooled engine, comprising:

a heating heat exchanger for heating said passenger compartment by performing heat-exchange between cooling water having cooled said water-cooled engine and air to be blown into said passenger compartment;

a heat-generating unit using a shearing force, said heat-generating unit including a rotor which rotates when a driving force is applied thereto and a heat-generating chamber for sealing therein viscous fluid which generates heat for heating said cooling water circulating between said engine and said heating heat exchanger when a shearing force generated by a rotational force of said rotor is applied to said viscous fluid;

a clutch unit for intermitting a transmission of the driving force from said engine to said rotor;

heating instruction means for giving an instruction for heating said cooling water by said heat-generating unit; and a heating control unit which controls said clutch unit to transmit the driving force of said engine to said rotor after increasing a rotational speed of said engine when said heating instruction means gives the instruction for heating said cooling water, said heating control unit including means for detecting a temperature of said cooling water, said rotational speed of said engine being set to a first speed when said temperature of said cooling water is lower than predetermined temperature and said rotational speed of said engine being set to a second speed when said temperature of said cooling water is higher than the predetermined temperature, said second speed being lower than said first speed.

2. A heating apparatus according to claim 1, wherein:

said heating control unit includes driving state detection means for detecting a driving state of said engine; and said heating control unit controls said clutch unit to transmit the driving force of said engine to said rotor after increasing an idling rotational speed of said engine when said driving state detected by said driving state detection means is idling.

3. A heating apparatus according to claim 1, wherein:

said heating control unit includes driving state detection means for detecting a driving state of said engine; and said heating control unit controls said clutch unit to transmit the driving force of said engine to said rotor after a predetermined time has elapsed after increasing an idling rotational speed of said engine when said driving state detected by said driving state detection means is idling.

4. A heating apparatus according to claim 3, wherein said heating control unit controls said clutch unit to transmit the driving force of said engine to said rotor after a predetermined time has elapsed after increasing an idling rotational speed of said engine to a target rotational speed when said driving state detected by said driving state detection means is idling.

5. A heating apparatus according to claim 4, wherein said rotational speed is set in such a manner that the larger said temperature of said cooling water is, the lower said rotational speed becomes.

6. A heating apparatus according to claim 4, wherein said rotational speed is set to the maximum value when said temperature of said cooling water is less than a predetermined value.

7. A heating apparatus according to claim 1, wherein said second speed is decreased as the temperature of the cooling water is increased.

8. A heating apparatus for heating a passenger compartment of a vehicle having a water-cooled engine, comprising:

a heating heat exchanger for heating said passenger compartment by performing heat-exchange between cooling water having cooled said water-cooled engine and air to be blown into said passenger compartment;

a heat-generating unit using a shearing force, said heat-generating unit including a rotor which rotates when a driving force is applied thereto and a heat-generating chamber for sealing therein viscous fluid which generates heat for heating said cooling water circulating between said engine and said heating heat exchanger when a shearing force generated by a rotational force of said rotor is applied to said viscous fluid;

a driving force transmission unit for transmitting the driving force from said engine to said rotor;

shearing state switching means for switching a shearing state of the viscous fluid by the rotation of said rotor;

heating instruction means for giving an instruction for heating said cooling water by said heat-generating unit; and a heating control unit which controls said shearing state switching means to apply a shearing force to the viscous fluid by the rotational force of said rotor after increasing a rotational speed of said engine when said heating instruction means gives the instruction for heating said cooling water, said heating control unit including means for detecting a temperature of said cooling water, said rotational speed of said engine being set to a first speed when said temperature of said cooling water is lower than predetermined temperature and said rotational speed of said engine being set to a second speed when said temperature of said cooling water is higher than the predetermined temperature, said second speed being lower than said first speed.

9. A heating apparatus according to claim 8, wherein:

said heating control unit includes driving state detection means for detecting a driving state of said engine; and said heating control unit controls said shearing state switching means to apply the shearing force to the viscous fluid by the rotational force of said rotor after a predetermined time has elapsed after increasing an idling rotational speed of said engine to a target rotational speed when said driving state detected by said driving state detection means is idling.

10. A heating apparatus according to claim 9, wherein said second speed is decreased as the temperature of the cooling water is increased.

11. A heating apparatus according to claim 10, wherein:

said heating control unit includes driving state detection means for detecting a driving state of said engine; and said heating control unit controls said clutch unit to transmit the driving force of said engine to said rotor after increasing an idling rotational speed of said engine when said driving state detected by said driving state detection means is idling.

12. A heating apparatus for heating a passenger compartment of a vehicle having a water-cooled engine, said heating apparatus comprising:

a heat exchanger for heating said passenger compartment by performing heat-exchange between cooling water having cooled said water-cooled engine and air to be blown into said passenger compartment;

a heat generating unit including a rotor which rotates within a chamber when a driving force from said engine is applied thereto, said chamber sealing therein viscous fluid which generates heat for heating said cooling water circulating between said engine and said heat exchanger when a shearing force generated by rotation of said rotor is applied to said viscous fluid;

a clutch unit for selectively transmitting said driving force from said engine to said rotor;

means for giving an instruction for heating said cooling water by said heating generating unit; and a heating control unit which controls said clutch unit and said engine, said heating control engaging said clutch to transmit said driving force to said rotor after increasing a rotational speed of said engine to a predetermined speed, said predetermined speed being selected from a range of speeds between a minimum speed and a maximum speed.

\* \* \* \* \*

UNITED STATES PATENT AND TRADEMARK OFFICE
CERTIFICATE OF CORRECTION

PATENT NO. : 5,852,995

DATED : December 29, 1998

INVENTOR(S) : Shinji Aoki et al

It is certified that error appears in the above-identified patent and that said Letters Patent is hereby corrected as shown below:

Col. 1, line 29, delete "with" & substitute --within the-- therefor

Col. 2, line 46, delete "heat-heating" & substitute --heating heat-- therefor

Col. 3, line 60, delete "connecting" & substitute --connected-- therefor

Col. 6, line 26, "and" should be --an--

Col. 7, line 32, after "detected" insert --by the--

Col. 7, line 37, delete "are" & substitute --air-- therefor

Col. 8, line 34, delete "The" & substitute --the-- therefor

Col. 9, line 59, delete "nor" & substitute -- or not-- therefor

Col. 10, line 35, delete "precess" & substitute --process-- therefor

Col. 11, line 52, delete "FIGS. 10" & substitute --FIG. 10-- therefor

Col. 11, line 62, after "connected" insert --to--

Col. 12, line 56, delete "embodiment" & substitute --embodiments-- therefor

Col. 13, line 8, delete "heat" & substitute --heater--

UNITED STATES PATENT AND TRADEMARK OFFICE
CERTIFICATE OF CORRECTION

PATENT NO. : 5,852,995

DATED : December 29, 1998

INVENTOR(S) : Shinji Aoki et al

It is certified that error appears in the above-identified patent and that said Letters Patent is hereby corrected as shown below:

Col. 15, line 8, claim 10, "claim 9" should be --claim 8--

Col. 16, line 14, claim 12, delete heating" & substitute --heat-- therefor

Signed and Sealed this

Fourteenth Day of September, 1999

Attest:

Attesting Officer

Q. TODD DICKINSON

Acting Commissioner of Patents and Trademarks